United States Patent [19]

Bruesselbach

[11] Patent Number: 5,774,619
[45] Date of Patent: Jun. 30, 1998

[54] PRECISION DEFORMATION MECHANISM AND METHOD

[75] Inventor: Hans Bruesselbach, Calabasas, Calif.

[73] Assignee: Hughes Electronics Corporation, El Segundo, Calif.

[21] Appl. No.: 647,541

[22] Filed: May 15, 1996

[51] Int. Cl.$^6$ ..................................................... G02B 6/34
[52] U.S. Cl. ...................... 385/137; 250/227.16; 385/37; 385/136
[58] Field of Search ................................. 385/15, 31, 32, 385/37, 136, 137, 147; 250/227.16

[56] References Cited

U.S. PATENT DOCUMENTS

| | | |
|---|---|---|
| 4,477,725 | 10/1984 | Asawa et al. ...................... 250/227.16 |
| 4,636,031 | 1/1987 | Schmadel, Jr. et al. ................... 385/37 |
| 4,709,456 | 12/1987 | Iyer ...................................... 29/897.35 |
| 4,770,047 | 9/1988 | Arditty et al. .................. 250/227.16 X |
| 5,321,257 | 6/1994 | Danisch ............................. 250/227.16 |
| 5,367,589 | 11/1994 | MacDonald et al. ...................... 385/37 |
| 5,469,520 | 11/1995 | Morey et al. .............................. 385/37 |
| 5,613,023 | 3/1997 | Guillon et al. ............................ 385/37 |

OTHER PUBLICATIONS

O'Shea et al. *An Introduction to Lasers and Their Applications*, Addison–Wesley Publishing Co., 1977, pp. 231–232. (No Month).
M.J.N. Sibley, *Optical Communications*, McGraw–Hill, Inc., 1990, p. 137. (No Month).
*Machinery's Handbook*, 22nd Edition, Industrial Press, 1984, p. 308. (No Month).

*Primary Examiner*—John D. Lee
*Attorney, Agent, or Firm*—V. D. Duraiswamy; W. K. Denson-Low

[57] ABSTRACT

A simple, low-cost deformation mechanism and method produces submicrometer increments of motion, to precisely stretch and compress fibers containing optical gratings in order to achieve a desired length and period. Such a "tunable" fiber can be used to, for example, produce an optical filter or to "match" two fiber lasers, thus enabling their use in a coherent detection system. Two beams, parallel to and opposing each other, are joined at two places. A screw is positioned between the beams such that a force is exerted on both beams simultaneously when the screw is rotated, deforming both beams. Motion reduction is provided by sharing the screw's movement between the two beams, and is further enhanced by making one beam thicker than the other. Two fibers are secured into grooves provided on one of the beams. By rotating the screw to increase or decrease the deformation, the fibers and their respective gratings are stretched or compressed. Because the grooves are at different distances from the point where force is applied, the two fibers are subjected to different amounts of deformation as the screw is turned. When the fibers are used as lasers, the difference in the frequencies of the two lasers can be adjusted with the mechanism, and reduced to within the bandwidth of a photodetector. Once "matched," the fiber lasers and the mechanism can be used in a coherent detection system.

24 Claims, 4 Drawing Sheets

PRECISION DEFORMATION MECHANISM AND METHOD

BACKGROUND OF THE INVENTION

1. Field of the Invention

This invention relates to the field of mechanical devices and methods for producing very small, controlled movements, and particularly for mechanisms used to adjust the length of fibers containing optical gratings.

2. Description of the Related Art

Many devices exist that provide controlled movements in small increments. The need for such a mechanism is especially prevalent in the field of fiber optics, when, for example, it may be necessary to have two laser sources producing light with nearly equal frequencies, such as in a coherent detection system.

In a coherent detection system, one laser source acts as a local oscillator, producing light at a reference frequency $f_1$. A second laser source, the "signal laser," produces light at a frequency $f_2$, nearly equal to $f_1$. The signal laser light is modulated in some way, combined with the local oscillator light, and mixed at a photodetector. The output of the photodetector varies with the frequency difference between the two signals, known as the "beat frequency." The beat frequency will vary with the modulation of the light from the signal laser. Coherent detection is described in O'Shea et al., *An Introduction to Lasers and Their Applications*, Addison-Wesley Publishing Co. (1977), pp. 231–232.

For coherent detection to work, the beat frequency must be within the bandwidth of the photodetector used. A low-cost photodetector may have a bandwidth of about 200 MHz. To use this type of photodetector in a coherent detection system, the two laser sources must produce light at frequencies that are less than 200 MHz apart, and preferably less than 100 MHz apart. There exists a need for a simple, low cost mechanism or method that can provide lasers that are matched this closely.

A fiber laser can be made by doping the core of an optical fiber with any of a number of rare-earth ions, for example erbium or neodymium, and pumping the resulting doped fiber with a laser diode. If an optical grating is induced into the laser, the period of the induced grating determines the frequency of light produced by the laser. The period of the grating can then be "tuned" by adjusting the length of the fiber, thus stretching or compressing the portion of the fiber containing the grating. If two fiber lasers are tuned to produce light at nearly equal frequencies, matched lasers usable in a coherent detection system can be obtained. This tuning requires an ability to precisely control a fiber laser's length in submicrometer increments.

A fiber containing an optical grating has uses in addition to that of a fiber laser, such as an optical filter. A tuning capability is desired here as well, in order to tune the filter to produce a desired frequency response. Tuning can be accomplished by precisely adjusting the length of the fiber.

Micrometric screws have been utilized to provide this type of fiber length adjustment. A fixture is made having two pieces of metal that are held apart by a micrometer. One end of the fiber being tuned is glued to one piece of metal, with the other end glued to the other piece of metal. The fiber is tuned by adjusting the micrometer. However, this method may not provide the resolution (i.e. the smallest practical increment of length) needed to adequately match two fiber gratings for use in a coherent detection system. Improved resolution can be obtained by introducing a costly differential screw mechanism, but such a mechanism suffers from inherent difficulties such as backlash and nonlinear movement.

The period of a fiber grating can also be affected by temperature. Another matching technique involves placing the two lasers to be matched on temperature-controlled aluminum plates, finding the temperature that each fiber must be at to provide an adequate match, then precisely holding those temperatures. This technique requires costly and complex temperature control and measurement equipment that must be active whenever the fibers are in use.

Another tuning method involves bonding a piezoelectric transducer to the side of a fiber laser containing a grating. A voltage applied to the transducer will affect the period of the grating. This method also requires complex monitoring and control circuitry to establish and maintain the close frequency matching required in a coherent detection system. This method is described in M. J. N. Sibley, *Optical Communications*, McGraw-Hill, Inc. (1990), p. 137.

A need exists for a device that can provide submicrometer increments of mechanical motion, so that the lengths of fibers containing optical gratings can be precisely controlled.

SUMMARY OF THE INVENTION

A simple, low-cost, environmentally-stable mechanism is used to produce submicrometer increments of motion, and thereby to precisely adjust the length of fibers containing optical gratings, in order, for example, to create fiber lasers producing frequencies of light that are "matched," thus enabling their use in a coherent detection system.

A first member is joined to a second member at two places, and is free to bend between the two junctions. A screw or similar device is placed between the members so that the distance between their centers is adjusted. In response to the force that is exerted simultaneously on both members by the screw, each member will deform by "bowing" away from the force. By rotating the screw up and down, the force exerted on the members is increased and decreased, increasing and decreasing the amount of deformation. If both members are identical except that one is thicker than the other along the direction with which force is applied, the thinner member will absorb more of the screw's movement than will the thicker member, thus deflecting more than the thicker member for a given amount of screw movement. This motion reduction technique is used to enable the thicker member to be deflected in very small increments. An object placed in tight contact with the thicker member can be precisely stretched or compressed with this mechanism.

The preferred mechanism consists of a thick beam and a thin beam, each beam being a straight rod with a short perpendicular leg at each end, the two beams joined at these legs to form an open rectangle structure, with the beams parallel to and opposing each other. A fine pitch screw is positioned between the beams, and adjusted so that it is exerting force on both beams simultaneously, i.e. "prestressing" the mechanism. Longitudinal grooves are provided in the thick beam, into which two fibers containing optical gratings are placed. The fibers are secured to the mechanism with glue. Such optical-grating containing fibers have numerous uses, for example, as optical filters or fiber lasers. When used as fiber lasers, such as are used in a coherent detection system as discussed herein, these gratings determine the frequency of light produced by their respective lasers. By rotating the screw to increase or decrease the force on the beams, the lasers and their respective gratings are stretched or compressed, thus altering the frequency of light produced by each laser. For a fiber used as a filter, using the mechanism to stretch or compress the gratings will tune the filter to provide a desired frequency response.

The grooves in which the two fibers are placed are at different distances from the edge of the beam. This difference results in the two fibers being subjected to different amounts of deformation as the screw is rotated. Thus, when used as fiber lasers, the relative difference in the frequencies of the two lasers will change as the beam is deformed. A deformation mechanism holding two fiber lasers in this way can then be used as a component in a coherent detection system as described above. By simultaneously adjusting the deformation and monitoring the system's photodetector output, the gratings and their respective lasers can be matched.

One important application of such a coherent detection system is an automotive collision avoidance radar, in which the local oscillator and signal laser are on one vehicle, and the signal laser light is modulated by bouncing it off of a second vehicle. Monitoring the beat frequency can yield information about the relative speed and distance between the two vehicles.

The two beams of the mechanism are preferably formed from one piece of thermally conductive material, so that the lasers remain matched in changing environmental conditions.

DETAILED DESCRIPTION OF THE INVENTION

The invention provides a mechanism and method that can produce precisely controlled movements in submicrometer increments, thus meeting the need for a low cost, environmentally stable means to precisely adjust the lengths of optical fibers containing optical gratings.

Figure 1:
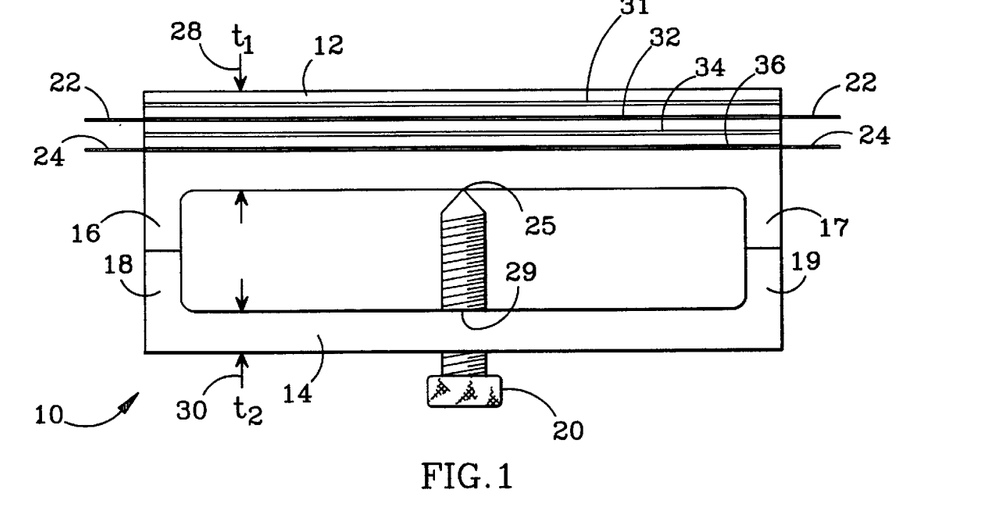
FIG. 1 is a plan view of the preferred embodiment of the invention.
Figure 2:
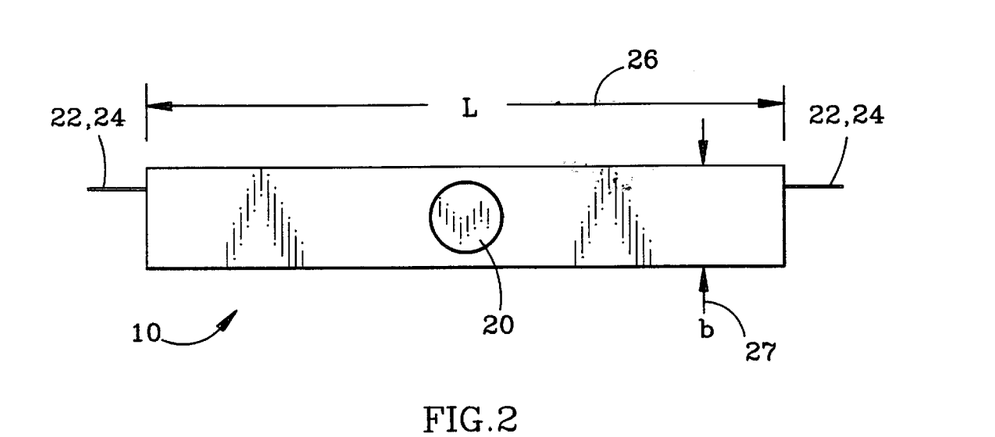
FIG. 2 is a front elevation view of the preferred embodiment of the invention.
Figure 3:
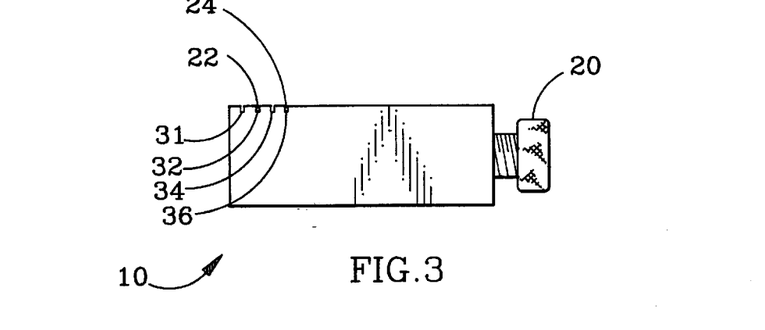
FIG. 3 is a side elevation view of the preferred embodiment of the invention.

A preferred precision deformation mechanism is shown in FIGS. 1, 2 and 3. The mechanism 10 comprises two members, in which each member is preferably a solid beam. Each beam comprises a straight rod portion with a short, perpendicular leg at either end of the rod. A first beam 12 is joined at its legs 16, 17 to the corresponding legs 18, 19 of a second beam 14 to form an open rectangle structure, with the beams parallel to and opposing each other. An extendible and retractable device 20, preferably a screw, is placed between the two beams 12, 14 and adjusted so that it exerts force on the mid-section of both beams simultaneously, i.e. "prestressing" the mechanism. One beam is preferably thicker than the other in the direction in which the force is exerted. The force causes both thick and thin beams to deform, i.e. to deflect or "bow" outward in response to the force, in the area between their respective legs (16, 17 and 1B, 19). As the screw 20 is rotated, the thinner beam 14 will absorb more of the screw's motion than will the thick beam 12, and thus the thick beam will move less than the thin beam for a given amount of screw movement. This motion reduction technique enables the mechanism to produce very small increments of motion. When properly designed, the mechanism can provide a resolution, i.e. the smallest practical increment of length, of less than one part in a million.

A pair of fiber lasers containing optical gratings 22, 24 are tightly secured to the thick beam 12, and then stretched or compressed by rotating the screw 20 until the lasers are "matched" for use in a coherent detection system, i.e. producing light at frequencies within 100 MHz of each other.

The mechanism is useful for many applications in which there is a need to adjust the length of a fiber containing a grating. For example, such a fiber may be used as an optical filter. Using the mechanism to stretch or compress a fiber used for this purpose allows the filter to be tuned to provide a desired frequency response. The relative difference in frequency response between two such filters may be maintained by use of the mechanism.

The motion reduction technique relied upon exploits the controlled differential bending of two solid beams. A first beam 12 is subjected to a force applied at about the beam's midpoint 25. The deflection of the first beam 12 due to the applied force is given by:

$$D_1 = 4Lf/3bt_1^2$$

where $D_1$ is the amount of deflection at the beam's midpoint 25, L is the length 26 of the beam 12, f is the force applied to the beam at its midpoint 25, b is the breadth 27 of the beam, and $t_1$ is the thickness 28 of the beam, i.e. the dimension of the beam along the direction by which force is applied. This relationship is given in the *Machinery's Handbook*, 22nd Edition, Industrial Press (1984), p. 308.

A second beam 14, preferably made of the same material and having the same length and breadth as the first beam 12, is joined at its legs 18, 19 to the first beam's legs 16, 17, forming a rectangle-shaped structure. If force is applied at the second beam's midpoint 29, the deflection of the second beam 14 is given by:

$$D_2 = 3Lf/4bt_2^2$$

where $D_2$ is the amount of deflection at the beam's midpoint 29, L is the length of the beam 14 (equal to the first beam's length), f is the force applied at the beam's midpoint 29 (equal to the force applied to the first beam), b is the breadth of beam (equal to the first beam's breadth), and $t_2$ is the thickness 30 of the second beam 14.

These equations yield a formula relating the first beam's deflection ($D_1$) to the second beam's deflection ($D_2$)

$$D_1 = D_2 \times (t_2/t_1)^2$$

By using two parallel opposing beams in this way, and selecting the thicknesses of the two beams appropriately, a predictable amount of motion reduction is achieved. For two beams that differ in thickness only, the thin beam will deflect more than the thick beam for a given amount of force. The greater the ratio of the two thicknesses, the greater the amount of motion reduction.

The thick beam 12 and the thin beam 14 may be two separate pieces, or are preferably formed from one piece of material. A one piece unitary structure is preferred due to the improved thermal consistency provided. The period of the optical gratings contained within the fiber lasers 22, 24 will vary with temperature. If both lasers can be kept at the same temperature the gratings will be affected equally, and the relative frequency of light produced by the two lasers will be kept constant. Using one piece of material to form the two beams helps keep a consistent temperature throughout the mechanism.

To further enhance thermal consistency throughout the mechanism, the beams 12, 14 should be fabricated from a material that is highly thermally conductive. Aluminum is preferred due to its high thermal conductivity and machinability. It is also recommended that the extendible and retractable device 20 used to exert force on the two beams 12, 14 be made from the same material as the beams, to further insure a high level of thermal consistency throughout the mechanism.

An alternate, "single beam" embodiment comprises an upper member, preferably a deformable beam, mounted to a rigid, unyielding base member, with an extendible and retractable device, such as a screw, positioned between the base member and the beam. This mechanism would also be useful for providing precise increments of motion, however, rather than dividing the movement of the screw between two beams as with the first embodiment, movement of the screw would be taken up almost entirely by the deformation of the single beam. This configuration does not give the motion reduction advantages provided by use of a thick and thin beam, and thus offers a lesser amount of resolution than would an equivalent two beam embodiment. However, such a mechanism could be useful to provide, for example, coarse tuning of two fiber lasers.

It is not essential that there be an open area between the two beams, or between the deformable beam and a rigid base member. It is only necessary that each deformable beam have an area that is free to deform in response to an applied force, and that the force is applied in this area. Thus, two solid rod-shaped beams, without legs, are placed flush against each other, and are joined at two places along their common boundary. A screw, for example, is then threaded through one beam and made to exert a force on the second beam, prestressing the mechanism. A mechanism using this configuration operates in the same way as the open rectangle-shaped embodiment discussed above, and offers the same motion reduction characteristics. Such a configuration may, however, be more difficult to fabricate.

It is not essential that the two members 12, 14 be beams or be rod-shaped. It is only necessary that the members (or member, for the single beam embodiment) bend in response to an applied force, and will tend to return to their original shape when the force is reduced.

It is also not necessary that the two members 12, 14 be joined at their respective ends. It is only necessary that the two members are connected at two places, that the members have a deformable portion between those places (only the upper member need be deformable for the single beam embodiment), and that the force exerted by the extendible and retractable element be applied to the deformable regions of the members.

To provide an optical grating matching function, the preferred embodiment of the mechanism 10 utilizes a number of parallel grooves 31, 32, 34, 36 preferably located on the thick beam 12, since this beam offers the best resolution. The grooves are oriented between the ends 16, 17 of the beam, perpendicular to and spaced at varying distances from the point 25 where force is applied. As a result, each groove will exhibit a different amount of deformation for a given force, with the groove 31 farthest from the point 25 where force is applied deflecting the most, and the groove 36 closest to the point 25 where force is applied deflecting the least. It is this phenomenon that allows two fiber lasers 22, 24 mounted in two different grooves to be "matched."

Figure 4:
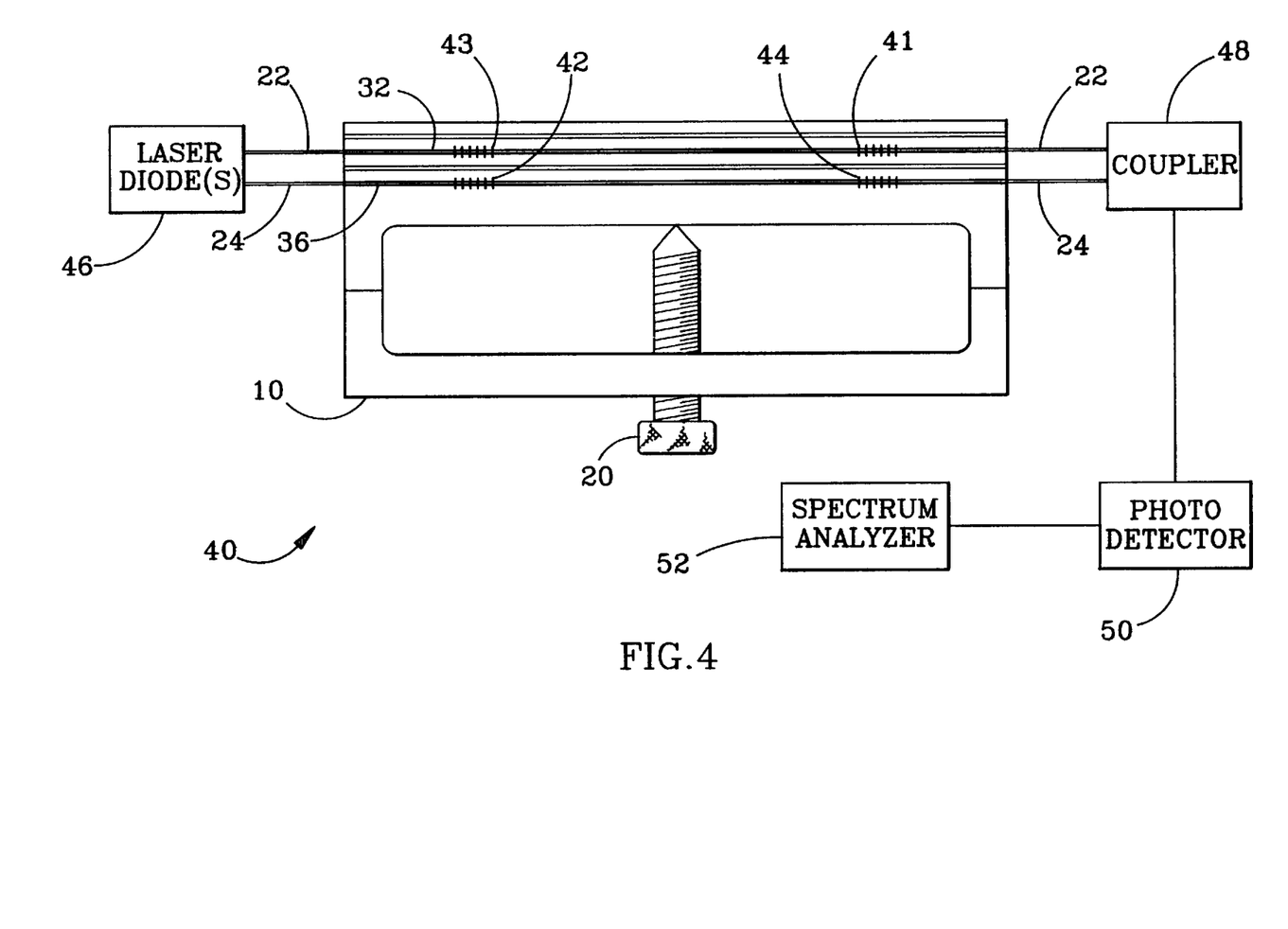
FIG. 4 is a combined block diagram and plan view of a coherent detection system that uses the invention.

To match the two fiber lasers 22, 24 using the mechanism 10, a coherent detection system 40 as shown in FIG. 4 is employed. First, optical gratings 41, 42, 43, 44 are induced into doped fibers as discussed above. The fiber laser 22 functioning as a signal laser will typically have two optical gratings 41, 43, and the fiber laser 24 functioning as a local oscillator will also have two gratings 42, 44.

The signal laser 22 and local oscillator 24 are placed into separate grooves 32, 36 on the mechanism 10, positioned so that the optical gratings 41, 42, 43, 44 are between the ends of the beam 12. Prior to installing the lasers, the mechanism 10 is adjusted such that force is being exerted on both beams 12, 14 simultaneously, prestressing the mechanism, so that the lasers can be stretched or compressed as necessary. If it is known that only stretching will be necessary, it is not necessary to prestress the mechanism. The fiber lasers 22, 24 are put into tight contact with the mechanism 10 by being glued into their respective grooves 32, 36. The two fiber lasers 22, 24 are optically connected at one end to a laser diode or diodes 46, which pumps both lasers, causing them to produce light. The signals from the local oscillator 24 and the signal laser 22 are combined, using, for example, an optical coupler 48 or beamsplitter, and the combined signal is mixed at a photodetector 50. The output of the photodetector 50 varies with the beat frequency, and represents the difference in the frequencies of light produced by the two fiber lasers 22, 24.

The photodetector 50 output is displayed on a spectrum analyzer 52. While monitoring the photodetector output on the spectrum analyzer 52, the screw 20 on the deformation mechanism 10 is rotated. This stretches or compresses the two fiber lasers 22, 24, changing the period of the induced optical gratings 41, 42, 43, 44, and thus the frequency of light produced by each laser. But since the two fiber lasers 22, 24 are being deformed by different amounts due to the separation between their respective grooves 32, 36, the two frequencies will not be changing equally. Thus, the difference in the two frequencies, i.e. the beat frequency, will change as the screw 20 is rotated. The mechanism 10 is adjusted until an acceptable beat frequency is attained. To be within the bandwidth of a low-cost photodetector 50, it is preferable to have a beat frequency of less than 100 MHz. If the two lasers produce light with frequencies within 100 MHz of each other, they are "matched," as that term is used herein. A beat frequency in this range is readily attainable with the preferred mechanism described.

Once the two fiber lasers 22, 24 have been matched, the lasers stay within the mechanism 10, and the deformation mechanism becomes a permanent component of a coherent detection system 40. An application that utilizes the mechanism in this way is a automotive collision avoidance radar system, in which the local oscillator 24 and signal laser 22 are installed in the mechanism 10 and placed in a first vehicle, and the signal laser light is modulated by bouncing it off of a second vehicle. Coherent detection is used to monitor the beat frequency, which can yield information about the relative speed and distance between the two vehicles.

Figure 5:
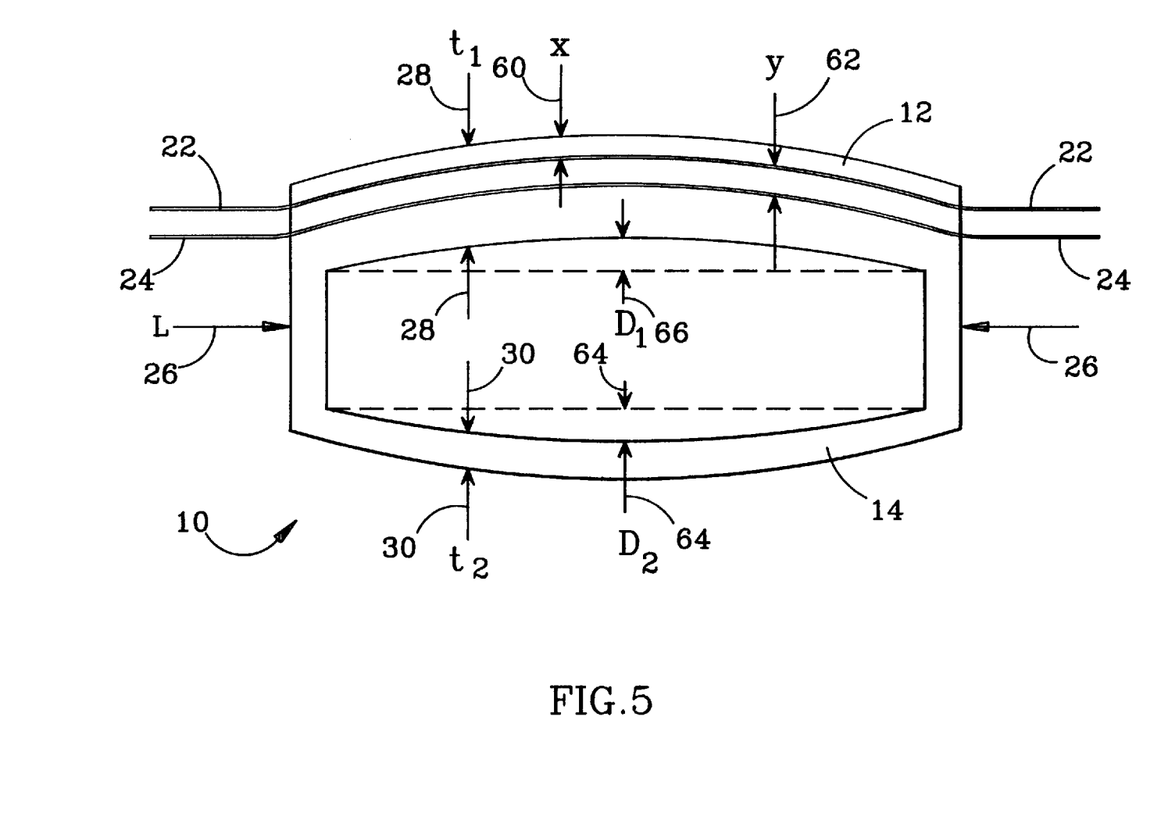
FIG. 5 is a plan view of the invention illustrating the parameters used to calculate the performance of the invention.

The following example illustrates how to determine the amount by which the beat frequency will be affected for a given amount of movement by the screw 20. Referring to FIG. 5, assume a beam length L (26) of 200 mm, a thick bar 12 thickness $t_1$, (28) of 15 mm, a thin bar 14 thickness $t_2$ (30) of 1.5 mm, a distance x (60) from the top of the thick beam 12 to the first fiber laser 22 of 5 mm, a separation y (62) between the fiber lasers 22, 24 of 2.5 mm, and a deflection $D_2$ (64) of the thin bar 14 due to the force applied by the screw (not shown) of 1 mm. The deflection of the thick bar $D_1$ (66) is given by the formula stated above:

$$D_1 = D_2 \times (t_2/t_1)^2 = 0.01 \text{ mm}$$

Thus, if the thin bar 14 deflects 1 mm, the thick bar 12, ten times thicker than the thin bar, deflects 0.01 mm. This deflection will require a movement by the screw of 1.01 mm.

Next, determine the radius R of the circular arc described by the bottom of the beam 12 when it is being deformed. R is given by:

$$R = \frac{1}{8} \times (L^2/D_1) + (\frac{1}{2} \times D_1) = 500000.01 \text{ mm}$$

Now calculate $\Delta_1$, the fractional difference in length between the two fibers caused by the deflection calculated above. This is given by:

$$\Delta_1 = 2 \times (y/(2R + 2t_1 - 2x - y)) = 5 \times 10^{-6} \text{ mm}$$

Assume that the gratings 41, 42, 43, 44 induced into the fiber lasers 22, 24 each have a wavelength of about 1.5 μm, so that each laser produces light at a frequency v of about $2 \times 10^{14}$ Hz. The relative change in frequency $\Delta_2$ between the two fiber lasers 22, 24 for the 0.01 mm deflection of the thick bar 12 is given by:

$$\Delta_2 = v \times \Delta_1$$

$$\Delta_2 = 1 \text{ GHz}$$

Thus, for a mechanism and laser spacing per the stated dimensions, a 1 mm deflection of the thin bar 14, caused by a screw movement of 1.01 mm, will cause a relative change in the frequency between the two lasers 22, 24 of 1 GHz.

In this example, there is a screw movement of 1.01 mm. If a screw having 40 threads per inch is used to apply force to the two beams, it requires about 1.6 turns to cause the 1.01 mm deflection. To achieve a $\Delta_2$ of 100 MHz, as is needed to fall within the bandwidth of a low-cost photodetector, about 0.16 turns of the screw are needed. Since it is easy to control the turning of the screw to even a small fraction of a turn, a $\Delta_2$ of this magnitude is readily achievable.

Greater resolution can be achieved by altering some of these parameters. For example, increasing the ratio of beam thicknesses or reducing the separation between the fibers will reduce the effect that a given amount of screw movement will have on the relative frequency between the lasers. Using different materials in the two beams that are easier or harder to deform will affect the amount of deflection caused for a given amount of screw rotation. Also, a screw with a finer pitch, i.e. having more than 40 threads per inch, or using an extendible and retractable device 20 having better resolution than a fine pitch screw, would provide greater control over deflection.

Figure 6:
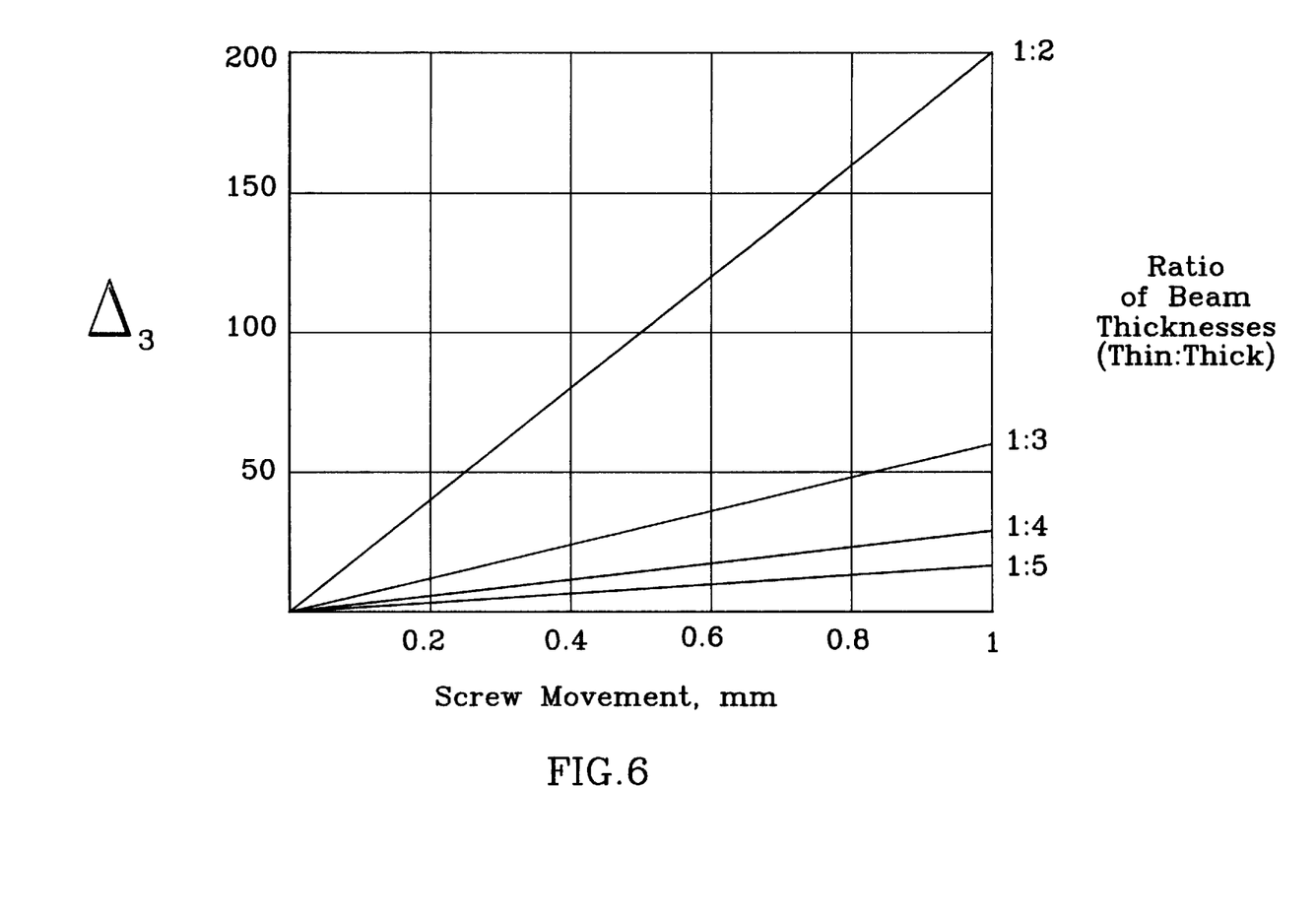
FIG. 6 is a graph illustrating the performance obtainable with the invention.

The effect that a change in the ratio of beam thicknesses would have on a typical mechanism as described in the example above, is shown in the graph in FIG. 6. This graph plots the relative difference ($\Delta_3$) in the lengths of two fiber lasers being matched versus the amount of screw movement, for various ratios of beam thicknesses. As the ratio increases, the resolution of the mechanism increases as well.

The preferred extendible and retractable device 20 is a fine pitch screw made of the same material as the beams, such as an aluminum screw having 44 or 56 threads per inch. Such a screw provides deflection in submicrometer increments, and once set, will maintain its length over time and in varying environmental conditions. However, other devices that can extend and retract may provide equivalent or better performance than a fine pitch screw. For example, a differential screw, a piezoelectric element, or a lever arrangement giving a mechanical advantage may be acceptable extendible and retractable devices.

To securely hold the fibers whose length is to be adjusted, it is preferred that each groove 31, 32, 34, 36 be as wide as the width of the fiber it is to hold, and have a depth equal to at least twice the fiber's diameter. The number and spacing of the grooves is not critical. However, a greater number of grooves spaced closely together will provide more flexibility when deciding how much deflection each fiber should be subjected to.

The fibers are preferably held in tight contact with the mechanism 10 with glue. A conventional epoxy, or a type of adhesive that does not warp when curing or over time, will suffice.

The mechanism 10 is effective for conventional silica glass fiber, including single-mode, multimode and polarization-maintaining fibers.

The deformation mechanism may be used to deform any type of object that can be securely fastened to a deformable beam, and thus would be useful in other applications in which well-controlled stretching or compressing is needed.

While particular embodiments of the invention have been shown and described, numerous variations and alternate embodiments will occur to those skilled in the art. Accordingly, it is intended that the invention be limited only in terms of the appended claims.

I claim:

1. A deformation mechanism, comprising:
   a base member,
   an upper member joined to said base member at two places that normally keeps said members from moving relative to each other between said places, said upper member having a deformable portion between said places, and
   an extendible and retractable element mounted between said base member and said deformable portion of said upper member, such that when extended or retracted said element exerts an applied force on both of said members, said force causing said upper member to deform such that an optical fiber mounted in tight contact with said upper member along the length of said deformable portion is precisely stretched or compressed and its length thereby varied.

2. The deformation mechanism of claim 1, wherein said extendible and retractable element is a screw positioned to apply force to said members at about their respective midpoints between said places.

3. The deformation mechanism of claim 1, wherein said base member and said upper member are a unitary structure formed from one piece of material.

4. The deformation mechanism of claim 1, wherein said base member is a rigid structure that does not substantially deform in response to said force, such that said upper member absorbs nearly all of said force exerted by said element.

5. The deformation mechanism of claim 1, wherein said upper member further comprises one or more grooves oriented perpendicularly to the direction in which said force is applied, said grooves accepting one or more optical fibers such that said fibers can be precisely stretched or compressed.

6. A deformation mechanism for optical fiber length adjustment, comprising:

a base member, an upper member joined to said base member at two places, said upper member being a first deformable beam and said base member being a second deformable beam, and an extendible and retractable element mounted between said first and second beams such that when extended or retracted said element exerts force simultaneously on both beams and causes both to deform, said deformation of said second beam absorbing some of said element's movement and reducing the amount of deformation of said first beam for a given amount of element movement, said reduced deformation tending to improve the precision with which said deformation of said first beam can be controlled.

7. The deformation mechanism of claim 6, wherein said first beam is thicker than said second beam along the direction in which said force is applied, whereby the precision with which the deformation of said first beam can be controlled increases with the ratio of thicknesses between said first beam and said second beam.

8. An optical fiber length adjustment mechanism, comprising:

a first beam, a second beam joined to said first beam at two places, both beams being deformable between said places, said beams forming two parallel opposing beams, and an extendible and retractable element mounted between said first and second beams and between said places, said element exerting force on both of said beams simultaneously such that when extended or retracted said force is respectively increased or decreased on said beams, said force causing both of said beams to deform between said places, whereby said deformation is shared between the two beams such that the deformation of said second beam reduces the amount by which said first beam deforms for a given force, and one or more optical fibers mounted in tight contact to one of said beams, said fibers each containing one or more optical gratings, said fibers positioned on said beam such that said deformation causes the length of each fiber and the period of each grating to change.

9. The mechanism of claim 8, wherein said first beam is thicker than said second beam along the direction in which said force is applied, such that the precision with which the deformation of said first beam can be controlled increases with the ratio of thicknesses between said first beam and said second beam.

10. The mechanism of claim 8, wherein said first and second beams are made from one piece of material forming a unitary structure, said structure tending to maintain a constant temperature throughout the mechanism, said constant temperature tending to maintain a constant relationship between the periods of optical gratings of respective fibers as the temperature of the mechanism varies.

11. The mechanism of claim 8, wherein said first and second beams are made of a material having a high thermal conductivity.

12. The mechanism of claim 8, wherein said first and second beams are made of aluminum.

13. The mechanism of claim 8, further comprising two or more parallel grooves on said first beam oriented perpendicularly to the direction with which force is applied, said fibers secured in said grooves such that said fibers are stretched and compressed by said deformation, the amount of said deformation for a given force differing for each groove such that a groove closer to the point where said force is applied deforms less than another groove farther from the point where said force is applied, whereby two fibers having optical gratings can be secured in two grooves and be precisely stretched or compressed.

14. The mechanism of claim 13, wherein said fibers are secured in said grooves with glue.

15. The mechanism of claim 8, wherein said extendible and retractable element is a fine pitch screw positioned to apply force at about the mid-point of each beam between said places, said screw formed of the same material as said first and second beams for maintaining a constant temperature throughout the mechanism.

16. The mechanism of claim 8, wherein said fibers are fiber lasers whereby said gratings determine the frequency of light produced by their respective lasers, such that said deformation causes the frequencies of light produced by said lasers to change.

17. The mechanism of claim 8, wherein said fibers are optical filters, such that said deformation causes the frequency response of said filters to change.

18. A coherent detection system, comprising:

a precision deformation mechanism including two parallel opposing beams, an extendible and retractable element mounted between said beams, said element exerting force on both of said beams simultaneously such that when extended or retracted said force on said beams is respectively increased or decreased, said force causing said beams to deform, two fiber lasers mounted in tight contact to one of said beams, said lasers each containing one or more optical gratings which determine the frequency of light produced by their respective lasers, whereby the deformation of the beam which said lasers are mounted to causes the period of said gratings and thereby the frequency of said produced light to change, an optical light source connected to each fiber laser, for pumping said lasers and causing said lasers to produce light, a coupling device for combining the light produced by both fiber lasers, said coupling device producing an optical output signal, and a photodetector, for mixing said optical output signal from said coupling device and producing an electrical output that varies with the difference between the frequencies of the light produced by said lasers, said difference in frequencies reduced by extending or retracting said element to adjust said deformation.

19. The coherent detection system of claim 18, further comprising a spectrum analyzer for displaying the electrical output of said photodetector, and for monitoring said difference in frequencies while adjusting said deformation to obtain a difference in frequencies that is within the bandwidth of said photodetector.

20. A method of adjusting the periods of optical gratings contained in respective fibers, comprising the steps of:

securing two or more fibers to a first beam, each fiber containing one or more optical gratings with each grating having a respective period, deforming said first beam, and monitoring the periods of said gratings while deforming said first beam until said gratings have a desired period.

21. The method of claim 20, wherein said first beam has two ends that are rigidly secured, and is deformed by applying force to the beam between said ends.

22. The method of claim 20, wherein said fibers are fiber lasers, whereby the periods of said gratings are monitored while deforming said first beam until said periods are more closely matched than before the lasers are secured to the beam.

23. The method of claim 22, wherein said monitoring of said periods is accomplished by coupling the light produced by said lasers, mixing said coupled light at a photodetector to measure the beat frequency, and displaying the photodetector output with a spectrum analyzer.

24. A method of adjusting the periods of optical gratings contained in respective optical fibers, comprising the steps of:
   securing two or more optical fibers to a first beam, each fiber containing one or more optical gratings with each grating having a respective period, said first beam joined to a second beam parallel to and opposing said first beam,
   applying a force to both beams simultaneously to achieve a reduced deformation of said first beam for a given force, for providing precise control of the deformation of said first beam.

* * * * *